Nov. 7, 1933.  A. I. MARCUM  1,933,675
TORQUE RESISTING ARRANGEMENT FOR MULTIWHEELERS
Filed April 25, 1930  2 Sheets-Sheet 2
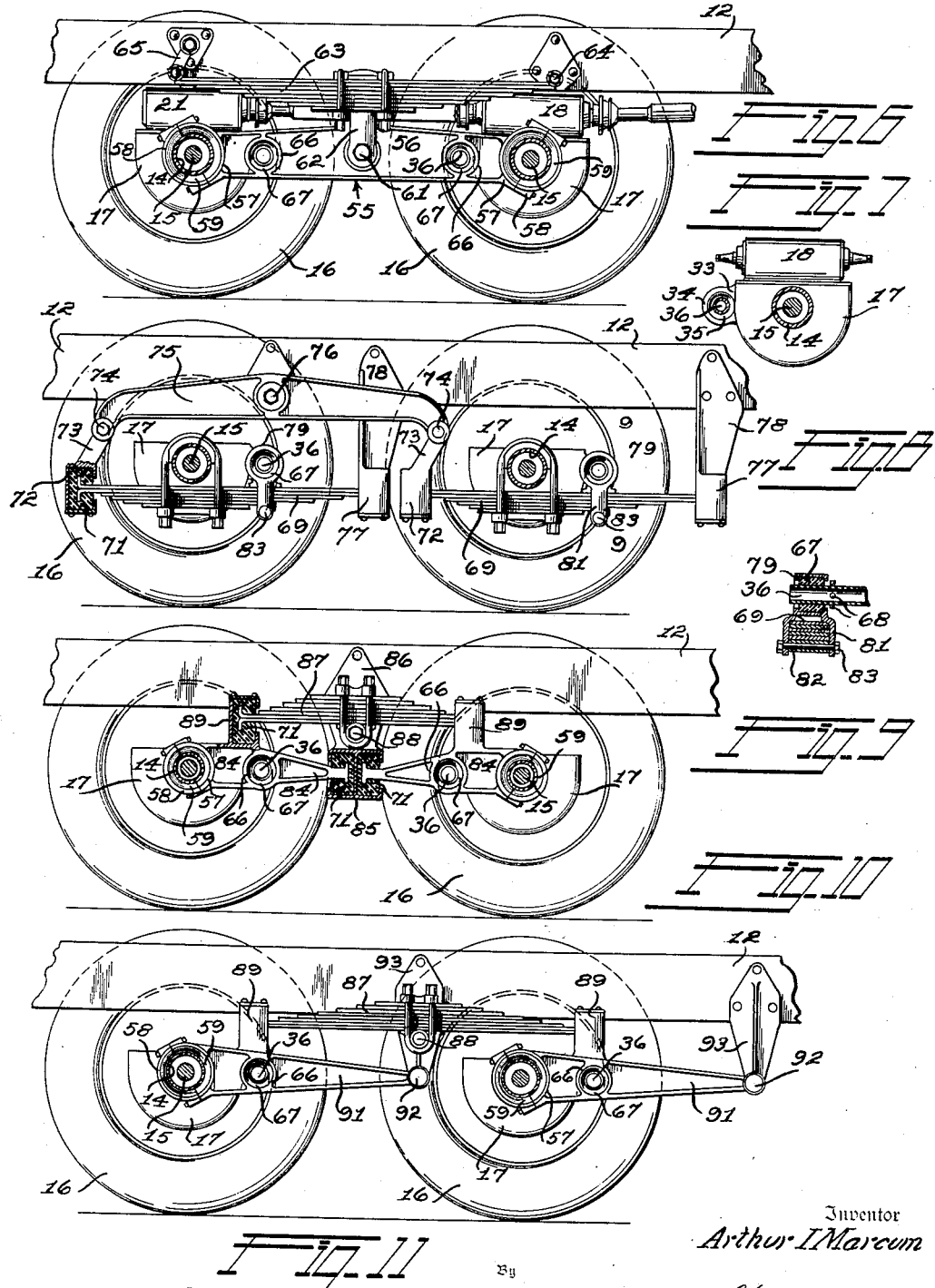

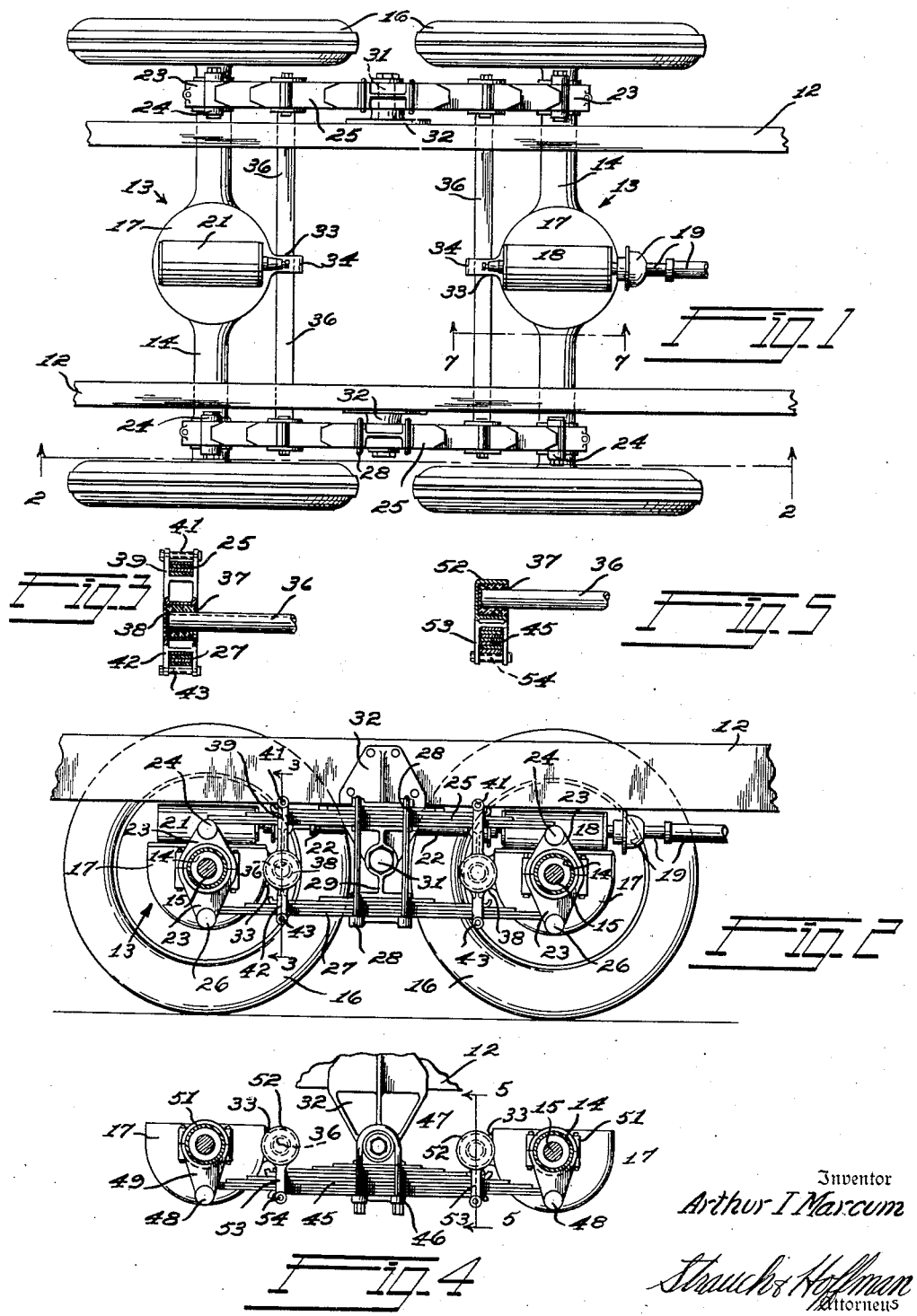

Patented Nov. 7, 1933

1,933,675

UNITED STATES PATENT OFFICE 1,933,675

TORQUE-RESISTING ARRANGEMENT FOR MULTIWHEELERS

Arthur I. Marcum, Oakland, Calif., assignor, by mesne assignments, to Automotive Engineering Corporation, a corporation of Delaware Application April 25, 1930. Serial No. 447,383

15 Claims. (Cl. 180—22)

This invention relates to tandem axle arrangements for multi-wheel vehicles wherein one or more of the axles is braked or driven, or both braked and driven, and thereby has a tendency to rotate about its axis during operation of the vehicle. The primary object of this invention is to incorporate new and improved torque-resisting arrangements in tandem axle suspensions for the purpose of resisting or counteracting said rotational tendency of the driven or braked axles.

It is an object of the present invention to provide torque-resisting arrangements for multiwheelers in which the torque-resisting elements shall be flexibly associated with the axles and suspensions to transfer the torque reactions from the former to the latter without hampering the operating flexibility of the tandem axle system. This object preferably is realized by utilizing means at various connections between the torque-resisting elements and the axles and suspensions to permit universal movement of said elements with respect to said axles and suspensions.

Another object of this invention is to transmit the torque reactions from the axles to the vehicle frame by way of the suspension system and, in so doing, to transmit such reactions from a given axle to both of the suspension mechanisms (at opposite sides of the frame) of the system.

In furtherance of the above-mentioned objects, other important objects of my invention are to provide a torque-resisting mechanism directly associated with a tandem axle suspension and (1) flexibly connected with an axle at a single point whereby it shall not materially restrict the flexibility of the suspension; and (2) flexibly connected with an axle at a single point centrally between the ends thereof, whereby swinging and tilting movements of said axle shall not be hampered, and whereby equalized torqueing and uniform distribution of load upon the axle are attained.

Another object is to provide torque-resisting devices which are so arranged with respect to the axles that they bodily substantially follow, or assume paths similar to, the paths of movement of the axles during operation of the vehicle over irregular road surfaces, and to make said devices of such a character that they be attached readily and conveniently to any type of suspension, whether new or already in service, as when converting the idle wheels of a dead axle into braked wheels or substituting a drive axle for a dead axle.

A further major object of the present invention resides in the provision of resilient and deformable connections between the torque-resisting elements and the tandem axle arrangement, whereby the necessary flexibility and universal movements are obtained without any necessity for lubrication, which otherwise would be necessary if the said elements and connections included sliding or rotating bearing surfaces as in the conventional devices heretofore known.

Other objects will become apparent from a study of the following detailed description, taken in connection with the accompanying drawings, in which:

Figure 1 is a plan view of one end of a multi-wheel vehicle, in which one form of the torque-resisting mechanism of this invention is incorporated in a tandem axle arrangement.

Figure 2 constitutes a vertical section taken on the plane represented by line 2—2 in Figure 1.

Figure 3 is a detailed view in vertical section, taken on the plane of line 3—3, Figure 2.

Figure 4 illustrates, in a partial view similar to Figure 2, a substituted form of suspension and a modified form of torque-resisting mechanism in combination with said substituted suspension.

Figure 5 represents a detailed vertical section taken on the plane indicated by line 5—5, Figure 4.

Figure 6 shows, in a manner similar to Figure 2, a further modification of the suspension and torqueing arrangements.

Figure 7 is a detailed side view of a central or differential housing of the illustrated axle assemblies, showing the preferred type of device for connecting said housing with the torque transfer rod, as seen, for example, when looking upon the vertical plane of line 7—7 in Figure 1.

Figure 8 discloses a further modification wherein the torque is transferred to a suspension system of the compensating and equalizing type.

Figure 9 constitutes a detailed vertical section taken longitudinally of one end of the torque transfer rod of the apparatus seen in Figure 8.

Figure 10 illustrates still another modified form of suspension and torqueing arrangement.

Figure 11 shows a still further modification, wherein the invention is adapted to another type of equalizing suspension.

With reference now to the drawings, in which like numerals are employed to designate similar parts, and with particular reference to Figures 1, 2 and 3, numeral 12 indicates the main chassis frame of a multi-wheel vehicle. Beneath this frame is arranged a pair of tandem axle assemblies 13, each of which comprises axle housings 14 for the line shafts 15, and each of which supports a pair of wheels 16 that are driven by the live shafts. The axle housings include centrally disposed differential housings 17, the forward one of which carries a through worm housing 18 into which projects a propeller shaft assembly 19, and the rearward one of which carries a worm housing 21. A flexible driving assembly 22 (partially removed from Figure 1 for clarity) interconnects the worm housings. All of this mechanism is conventional and needs no further description.

Each end of each axle housing 14 supports a pair of complemental hanger elements 23 which are fitted together as indicated either for oscillation as a unit about the housing or for limited universal movement with respect thereto. At each side of the frame, each upper element is pivotally connected, as at 24, to one end of a leaf spring 25, and each lower element is likewise pivotally connected, as at 26, to one end of a similar leaf spring 27. The central portions of springs 25 and 27 are clamped, by means of a U-bolt assembly 28, upon an I-bar 29 which is journaled upon a trunnion 31 supported by a frame-carried bracket 32. It will thus be seen that the frame and load is supported upon the axles by the axle-interconnecting springs 25 and 27 and that the latter are arranged to permit the axles to swing and tilt about the transverse axis of the trunnions 31. Driving and braking torque reactions are resisted through the spring suspension in the following manner:

Each of the differential housings 17 rigidly carries or supports a reactance lug 33 on that side thereof adjacent the trunnion axes. (See also Figure 7.) This lug is shaped to terminate in a cylindrical eye or collar 34, which collar receives a rubber ring 35 through which a torque transfer rod 36 extends with a relatively tight fit. The ends of rod 36 project laterally in parallelism with the axles and are received in rubber blocks 37 (Figure 3) which are tightly fitted within recesses in a laterally opposed pair of connectors 38. Each connector 38 has an integral upright arm 39 and a pin 41 cooperating to slidably receive the leaves of upper spring beam 25, and an integral depending arm 42 cooperating with another pin 43 to slidably receive the leaves of lower beam 27. The ends of certain of the spring leaves are turned upwardly, as shown, to prevent substantial shifting of the connectors 38 longitudinally of the springs.

From the foregoing description it will be obvious that I have provided an effective mechanism for transferring driving and braking torque reactions through the spring suspension to the frame to be overcome by the load. Since the transfer rods 36 are parallel to the axles and are reacted against at single central points through collars 34, the reacting forces are evenly distributed between the laterally opposed suspensions, and the axles are substantially free to take all movements that are permitted by such a suspension in the absence of the torqueing elements. To assure an absolute lack of restriction upon flexibility and to prevent twisting or damaging of the spring leaves, the resilient and deformable rubber cushions 35 and 37 are provided. These cushions also serve to eliminate much noise and vibration, and require no servicing attention such as lubrication. The cross rods 36 help somewhat to eliminate drag, and cooperate with their end connectors to dampen downward axle oscillation.

Although I have shown dual drive axles and a pair of torque-resisting mechanisms in Figures 1-3, and in the other illustrated embodiments about to be described, it should be understood that this invention is independent of the number, and types, of axles employed in combination, the invention residing in the prevention of rotation of any one or more rotatable axles of a group. In the case of a dead axle having braked wheels, the lug 33 may be extended and rigidly secured upon said dead axle.

In Figure 4 there is shown a modified arrangement, the worm housings, propeller shafts and wheels having been removed to avoid unnecessary duplication. In this form a single spring beam 45 takes the place of the double spring suspension, and is centrally pivoted by means of a U-bolt assembly 46, upon a trunnion 47 carried by the frame-bracket 32. The ends of the beam are pivotally supported, as at 48, upon a pair of depending hangers 49. These hangers cooperate with a pair of complemental caps 51, and the joined caps and hangers are adapted, as in Figures 1 and 2, to fit around the axle housings for journaled or universal movement with respect thereto.

A torque-resisting mechanism is provided for completing and stabilizing the suspension above described. It is substantially the same in principle and design as that of Figures 1-3, except for slight modifications to adapt it for combination with single spring beams. It comprises a lug 33 on each differential housing, which lugs have collars 34 and rubber rings for receiving a transverse rod 36 in the same manner as disclosed in Figures 1 and 7. Each rod 36 has its ends projecting into blocks 37 carried by a pair of opposed connectors 52 (see Figure 5 also). Each connector is secured to its corresponding spring 45 by an integral downwardly extending U-bracket 53 and a pin 54. The ends of certain of the spring leaves are bent, as shown, to prevent shifting of the bracket with respect to the spring. These torqueing mechanisms function in substantially the same manner as those of Figures 1-3.

In that form of the invention disclosed in Figure 6, another conventional type of suspension is combined with my improved torque-resisting mechanism. The axle housings are interconnected at their ends by substantially rigid bolsters 55, each comprising a body 56 terminating at its ends in semi-cylindrical housings 57 which cooperate with complemental and detachable semi-cylindrical caps 58 to receive rubber rings or doughnuts 59 and maintain them in engagement with the axle housings. Intermediate its ends the bolster is pivoted as at 61 upon a bracket 62 that is clamped upon and free to move with the central portion of a spring beam 63. The forward end of beam 63 is directly connected to the frame on a horizontal pivot 64, and the other end of said beam is connected to the frame by a shackle 65.

That side of each differential housing, facing the pivot 61, carries an integral lug 33 and an eye 34 for receiving a rubber ring 35, as in Figure 7. In transverse alignment with the holes in rings 35 each bolster body 56 is shaped to form integral substantially cylindrical housings 66 which receive rubber rings 67 of the nature of rings 35. These housings 66 may be open-ended, and the torque transfer rods 36 pass through rings 35 with their ends projecting through the rings 67. In such event the rods preferably are provided with radial lugs 68 (as in Figure 9, later to be described) to prevent longitudinal shifting of the rods. The rubber rings 59; 35 and 67 provide universal connections where interposed, and thus permit free and unhampered tilting and swinging of the axles during operation.

Figures 8, 9, 10 and 11 illustrate my invention as applied to various forms of compensating and equalizing suspensions. The torque-resisting mechanisms thereof are substantially the same in principle and design as those employed in Figures 1-7 and hence it will be sufficient to give a brief and general description of the combinations shown in each of these figures.

In Figure 8, each axle housing end has, rotatably clamped thereon, the intermediate portion of a spring beam 69. The rear end of each beam is T-shaped and gripped in a rubber block 71 carried by a housing 72 which forms an integral portion of a special shackle 73. The shackles 73 at each side of the frame are pivoted, as at 74, upon the ends of a compensating beam 75, the latter in turn being centrally trunnioned at 76 upon the vehicle frame. The forward ends of springs 69 are received in similar rubber blocks 71 (not seen) that are carried in housings 77 which form integral portions of frame-brackets 78.

The torque-resisting mechanisms are substantially the same as those of Figure 4, except that they are arranged forwardly of the axles, instead of facing each other, and they transfer the reactions to separate spring beams rather than to one that is common to both axles. Each mechanism comprises a transverse rod 36 connected to its corresponding differential housing in the manner shown at the rear axle of Figure 1, and having its ends extending through rubber rings 67 (see also Figure 9) that are received in connectors 79. The connectors have integral U-brackets 31 for clamping them upon the springs 69, the clamping being effected by pin assemblies comprising bushings 82 and through bolts 83. The rubber rings 35 and 67 cooperate with the rubber blocks 71 to permit end for end tilting of the axles without subjecting the suspension elements to twisting and destructive stresses. In this particular form the torque reactions of each axle are transmitted uniformly in a substantially equalized manner to all four springs of the suspension, due to the provision of compensating lever 75.

Another type of equalizing suspension is illustrated in Figure 10. At each side of the frame it comprises individual rigid arms 84 each of which has one end universally mounted on an axle housing as in Figure 6, and the other end projecting into a rubber block 71 carried by a double-block housing 85 that forms a part of a frame-bracket 86; and a compensating spring beam 87 centrally pivoted as at 88 upon bracket 86 and having its ends projecting into rubber blocks 71 within housings 89 rigidly formed on intermediate portions of the arms 84. The torque transfer rods 36 are associated with the differential housings and the arms 84 in the same manner that the rods 36 are connected to the corresponding housings and the bolster 55 in Figure 6.

The suspension of Figure 11 is very similar to that of Figure 10. Its axles swing in parallel, rather than opposing, arcs due to the fact that each of its rigid arms 91 is pivoted forwardly, as at 92, upon an individual frame-bracket 93. Because of this arrangement, both torque mechanisms are disposed at the forward sides of their corresponding axle assemblies. This is also true of the rubber block housings 89, the springs 87 having been lengthened sufficiently to meet the spacing requirements of such a change.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent, is:—

1. In a vehicle construction, a frame; a transverse axle having a rotative tendency during operation of the vehicle; a pair of suspension mechanisms, one at each side of said frame and including a pivotal axis transversely of the latter, for mounting said frame upon said axle; transverse means offset from said pivotal axis and interconnecting said suspension mechanisms; and means carried centrally of said axle, non-rotative with respect thereto, and associated with said transverse means to resist the said rotative tendency of said axle, said transverse means being parallel to said axle and designed to tilt therewith and to swing therewith about said transverse pivotal axis during operation of the vehicle.

2. In a vehicle construction, a frame; a transverse axle having a rotative tendency during operation of the vehicle; a pair of suspension beams, one at each side of said frame, for mounting said frame upon said axle, said beams being supported by said axle and pivotally connected to said frame on a common transverse axis; transverse means inter-connecting said suspension beams and independently of the frame; and means carried centrally of said axle, non-rotative with respect thereto, and associated with said transverse means to resist the rotative tendency of said axles, said transverse means being designed to flexibly interconnect said axle and said suspension beams, and to swing therewith about said common transverse axis during operation of the vehicle.

3. In a vehicle construction, a frame; a transverse axle having a rotative tendency during operation of the vehicle; a pair of suspension mechanisms, one at each side of said frame, for mounting said frame upon said axle; transverse means directly interconnecting said suspension mechanisms; and means carried centrally of said axle, non-rotative with respect thereto, and associated with said transverse means to resist the rotative tendency of said axle, the connections between said transverse means and said suspension mechanisms including rubber material permitting relative universal movement therebetween.

4. In a vehicle construction, a frame; a transverse axle having a rotative tendency during operation of the vehicle; a pair of suspension mechanisms, one at each side of said frame, for mounting said frame upon said axle; transverse means interconnecting said suspension mechanisms independently of said frame; and means carried centrally of said axle, non-rotative with respect thereto, and associated with said transverse means to resist the said rotative tendency of said axle, said axle-carried means and said transverse means being universally interconnected; and at least one of said suspension mechanisms being universally united with said transverse means.

5. In combination with the frame of a road vehicle, a transverse axle arranged beneath said frame and having a certain rotative tendency during operation of the vehicle; a pair of swinging load-supporting beams each having a portion supported by an end of said axle and having another portion directly pivoted upon a relatively stationary part of said frame; a substantially rigid torque-transfer means extending transversely between said beams with its ends flexibly supported thereby at points offset from the pivoted portions of the beams; and means rigidly connected with said axle and abutting said transfer means to prevent any axle rotation that might otherwise be caused by said rotative tendency.

6. In combination with the frame of a road vehicle, a transverse axle arranged beneath said frame and having a certain rotative tendency during operation of the vehicle; a load-supporting beam connected with said axle adjacent each end thereof at each side of said frame; a substantially rigid torque-transfer means extending transversely between said beams with its ends universally supported directly thereby independently of the frame; and means rigidly connected with said axle and abutting said transfer means to prevent any axle rotation that might otherwise be caused by said rotative tendency, said axle-connected means being disposed centrally of said axle.

7. In combination, a vehicle frame; a pair of tandem axles disposed beneath one end of said frame; a suspension mechanism at each side of said frame for supporting the latter upon the corresponding ends of said tandem axles, said mechanism including longitudinal beams having their ends supported by the axles and means pivotally connecting the mid portions of the beams to the frame; and means auxiliary to said suspension mechanism and associated with at least one of said axles to prevent rotation thereof in response to torque reactions, said auxiliary means comprising a substantially rigid and transversely arranged torque-transfer device interconnecting said suspension beams to move therewith, and means non-rotatively carried by said one axle and abutting said transfer device at a point closely adjacent said one axle.

8. In combination, a vehicle frame; a pair of tandem axles disposed beneath one end of said frame; a suspension mechanism at each side of said frame for supporting the latter upon the corresponding ends of said tandem axles; and means auxiliary to said suspension mechanism and associated with at least one of said axles to prevent rotation thereof in response to torque reactions, said auxiliary means comprising a substantially rigid and transversely arranged torque-transfer device interconnecting said suspension mechanisms to move therewith, and means non-rotatively carried by said one axle and abutting said transfer device; said last mentioned means being secured to said axle centrally thereof, and said transfer device being universally connected with said suspension mechanisms.

9. In combination, a vehicle frame; a pair of tandem axles disposed beneath one end of said frame; a suspension mechanism at each side of said frame for supporting the latter upon the corresponding ends of said tandem axles; and means auxiliary to said suspension mechanisms and associated with at least one of said axles to prevent rotation thereof in response to torque reactions, said auxiliary means comprising a substantially rigid and transversely arranged torque-transfer device interconnecting said suspension mechanisms to move therewith, and means non-rotatively carried by said one axle and abutting said transfer device, said suspensions including beams universally supported by said one axle, and said transfer device being universally supported by said suspension beams, whereby said axle is free to swing and tilt without restriction.

10. In a multi-wheel road vehicle, a chassis frame; a pair of transverse tandem axles arranged beneath said frame; means for supporting said frame upon said axles, comprising a beam pivoted upon each side of the frame with its ends supported by said axles; at least one of said axles being driven or braked, whereby it tends to rotate about its axis during operation of the vehicle; a torque-transfer device arranged transversely of the frame with its ends carried by said beams in offset relation to the pivotal points of the latter; and means united with said rotatable axle at an intermediate portion thereof and projecting into torque-resisting engagement with said transfer device.

11. In the apparatus set forth in claim 10, said transfer device comprising a rod parallel to said axles, and the last-mentioned means being disposed substantially within the vertical plane of the longitudinal axis of the vehicle.

12. In the apparatus specified in claim 10, means providing universal connections between said transfer device and said beams.

13. In the combination defined in claim 10, said beams being universally supported by said axles and flexibly connected with said torque-transfer device, whereby said axles are free to swing and tilt without restriction as the vehicle passes over road irregularities.

14. In a multi-wheel vehicle, a frame; a pair of tandem axles arranged transversely of said frame; and a suspension for mounting said frame upon said axles; said suspension comprising a single beam pivoted on each side of the frame between its ends at a point between the axles, means flexibly connecting the ends of said beams with the corresponding ends of the axles at points offset from the axes of the latter, and means for stabilizing at least one of said axles with respect to said beams and to transfer any torque reactions to the latter, said means comprising a transverse member connected between said beams and having a non-rotatable connection with said one axle.

15. In a multi-wheel vehicle, a frame; dual axles disposed in tandem beneath said frame; a suspension comprising a spring beam pivoted between its ends on each side of the frame and having its ends flexibly supported by the corresponding ends of the axles, a pair of inextensible radius arms disposed below each spring beam, each arm being connected at one end to an axle and pivotally connected at its other end to said frame at a point below the pivotal axis of said spring beam, whereby said axles partake of swinging movement in oppositely directed arcs about the vertical plane of said pivotal axis; and means for neutralizing any torque reactions developed by said axles during operation of the vehicle.

ARTHUR I. MARCUM.